United States Patent [19]

Barbier

[11] Patent Number: 5,239,293
[45] Date of Patent: Aug. 24, 1993

[54] METHOD AND DEVICE FOR THE REAR ILLUMINATION OF A LIQUID CRYSTAL MATRIX DISPLAY PANEL

[75] Inventor: Bruno Barbier, Le Bouscat, France

[73] Assignee: Thomson - CSF, Puteaux, France

[21] Appl. No.: 810,573

[22] Filed: Dec. 20, 1991

Related U.S. Application Data

[63] Continuation of Ser. No. 390,772, Aug. 8, 1989, abandoned.

[30] Foreign Application Priority Data

Aug. 9, 1988 [FR] France ............................. 88 10731

[51] Int. Cl.$^5$ .......................................... G02F 1/133
[52] U.S. Cl. ..................................... 340/784; 340/716; 359/50
[58] Field of Search ............... 340/716, 784, 811; 359/45, 48, 50; 315/224, 291; 358/236; 250/578; 362/27

[56] References Cited

U.S. PATENT DOCUMENTS

| | | | |
|---|---|---|---|
| 4,238,793 | 12/1980 | Hochstrate | 340/716 |
| 4,529,913 | 7/1985 | Brosillon | 315/291 |
| 4,824,216 | 4/1989 | Perbet et al. | 350/345 |
| 4,958,915 | 9/1990 | Okada et al. | 350/345 |

FOREIGN PATENT DOCUMENTS

19835 1/1987 Japan ............................. 350/345

*Primary Examiner*—Alvin E. Oberley
*Assistant Examiner*—Kara Farnandez
*Attorney, Agent, or Firm*—Cushman, Darby & Cushman

[57] ABSTRACT

A method and apparatus for diminishing flicker of a liquid crystal display (LCD) by producing a variable temporal modulation of the fluorescent tubes providing rear illumination of the LCD matrix panel. Fluorescent tubes are placed in a sequence behind the panel, parallel to lines of pixels of the panel. A high frequency supply of each tube is modulated by a low frequency periodic pulse control signal, the chopping rate of which is modulated. The modulation in the chopping rate of each low frequency periodic pulse control signal is determined by corresponding control signal. The control signals, delivered by a generator, are T/M phase shifted between two consecutive control signals, T being the image refreshing period and M the number of tubes. The control signals are individually adjusted to cause a rear illumination substantially in phase opposition with a means optical transmission of a zone of pixels facing each tube.

7 Claims, 7 Drawing Sheets

METHOD AND DEVICE FOR THE REAR ILLUMINATION OF A LIQUID CRYSTAL MATRIX DISPLAY PANEL

This is a continuation of application Ser. No. 07/390,772, filed on Aug. 8, 1989, now abandoned.

BACKGROUND OF THE INVENTION

1. Field of the Invention

The present invention concerns a method for the rear illumination of a liquid crystal matrix display panel, as well as the fluorescent tubes illumination device implemented according to the invention.

Liquid crystal display (LCD) screens or panels are light modulators wherein the transmission of each of the symbols to be represented is controlled electrically. The matrix panels are formed by dots (or pixels) which are distributed evenly in lines and columns throughout the surface and are controlled electrically by a matrix network of lines and columns. The image is refreshed periodically at a frame rate, the scanning being done line by line at a line rate. For a matrix panel with a total of N lines, the electrical information giving excitation is conveyed to the successive pixels of one and the same line for a period T/N, T being the total duration of scanning of the panel or frame duration. During the remaining interval of time, i.e. T(1−1/N) of each frame, the pixels are not excited. This periodic variation in excitation voltage leads to a ripple in the optical transmission which causes a visual flicker effect, which is all the more visible as the refreshing time is small. This phenomenon also increases with temperature.

When the maximum transmission that can be achieved, especially for polychrome panels is low, it is preferable to use an illumination device in the rear of the panel rather than a scattering/reflecting device which reflects the ambient illumination.

This rear illumination device is usually made by means of fluorescent tubes. To obtain satisfactorily uniform and high luminance on the entire rear face of the panel, it is necessary to use an assembly of several tubes, generally placed in parallel. The uniformity or homogeneity can be improved by using a scattering device placed between the tubes and the panel, as well as a reflector placed behind the tubes.

To modify the illumination, it is possible to control the luminance of the fluoresent tubes.

A prior art technique consists in using a DC/AC converter or inverter which takes a low DC voltage and gives the tubes a high-frequency AC voltage of some hundreds of volts designed to light the fluorescent tubes at each alternation. According to this technique, the variation in mean luminance of the tubes is obtained by all or nothing modulation, periodically at a low frequency rate, of the high-frequency AC voltage applied to the tubes. To this effect, a pulse with modulation of adjustable duration is produced: it can be used to cause variation in the mean intensity of the electrical current in the tubes and, consequently, in the luminance of the tubes. This pulse is repeated at the low frequency rate. If the low frequency of modulation is chosen to be sufficiently high (hundred or several hundreds of Hertz), the temporal luminance ripple that results therefrom is fast enough to be invisible.

This prior art technique does not, however, remove the flicker effect due to the refreshing frequency which is quite low and may have a period of 10 to 20 milliseconds for example.

SUMMARY OF THE INVENTION

An aim of the invention is to prevent or, at least, to reduce this flicker phenomenon due to the refreshing frequency. This is obtained by using a particular temporal modulation of the luminance of the fluorescent tubes and by placing these tubes parallel to the direction of the lines.

According to the present invention, there is provided a method for the rear illumination of a liquid crystal panel formed by a matrix of pixels arranged in successive lines, with a line by line scanning, this method using M, where M is a whole number greater than 1, tubes arranged behind the panel in a sequence, parallel to the direction of the lines. For each tube, a high frequency supplied and a low frequency periodic pulse control with an adjustable chopping rate to modulate the high frequency supply of the tube considered and cause variation in its luminance is supplied. Each tube illuminates a zone made of successive lines, wherein the variation in the chopping rate is determined to obtain a temporally variable rear illumination in synchronism with the scanning. For this purpose, the tubes are supplied with shifts of T/M between two consecutive tubes of the sequence, T being the image refreshing period, and a modulation of the chopping rate is determined for each tube substantially in phase opposition with the mean optical transmission of the zone of pixels illuminated by the tube considered. Thus, a substantially uniform luminance is obtained at output of said zone and in considering all the excited pixels.

According to the present invention, there is further provided a device for the rear illumination of a liquid crystal panel formed by a matrix of pixels arranged in successive lines, with a line by line scanning. This device uses M, where M is a whole number greater than 1, tubes arranged behind the panel, and controls the light intensity of each of the tubes. The device has a DC voltage supplied, a high frequency generator to prepare, from the DC voltage, a high frequency AC supply voltage, and means for the all or nothing modulation of the high frequency supply voltage to obtain a low frequency, periodic pulse control with an adjustable chopping rate, and modulation means. This device also has a generator of signals for the control of the tubes by producing M control signals at the panel image refreshing period T. These M control signals have mutual phase shifts of T/M for applying them respectively to the modulation means in order to produce a rear illumination in synchronism with the scanning and in opposition with the optical transmission procured by the pixels.

BRIEF DESCRIPTION OF THE DRAWINGS

The invention shall be better understood and other characteristics will emerge from the following description and the appended drawings, of which.

DETAILED DESCRIPTION OF THE PREFERRED EMBODIMENTS

Figure 1:
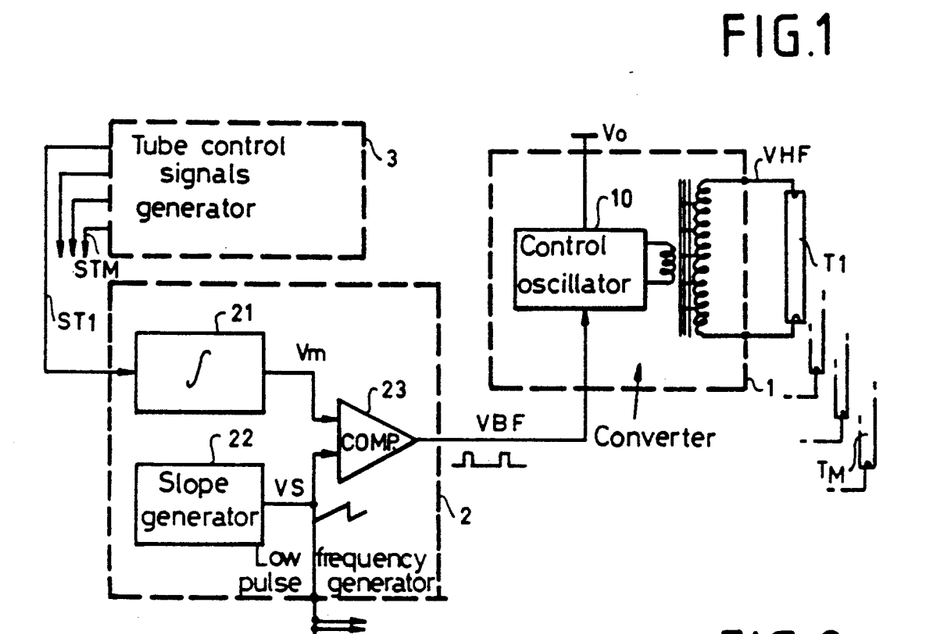
FIG. 1 is a simplified diagram of a matrix panel rear illumination device according to the invention.

The simplified diagram of FIG. 1 represents the control of the luminance of a fluorescent tube T1. This control is repeated for the M−1 other tubes of a sequence, T1 to TM, of M fluorescent tubes which are used to illuminate a matrix panel from the rear and are placed parallel to the lines of pixels of the matrix panel. The luminance is produced by a high frequency supply circuit 1 which has a high frequency (HF) inverter or converter supplied with a DC voltage VO to deliver, to the tube T1, a high frequency voltage with a period THF (FIG. 2c), which is sinusoidal or rectangular, for example. The HF converter receives a low frequency control sigal VBF to cause variation in the luminance of the fluorescent tube. The signal VBF is a low frequency periodic pulse control (FIG. 2b) with an adjustable chopping rate TBF/Tm to modulate the high frequency supply of the tube. To this effect, the circuit 1 has an oscillator 10 with all or nothing control by the signal VBF. The modulation voltage VBF of the HF converter is produced by a low-frequency pulse generator 2 from a control signal ST coming from a generator 3. In the prior art referred to, the signal ST is a DC voltage. The level of this signal ST can be made to vary, and it is applied through an integrator 21 to a first input of a comparator 23 which receives a slope voltage at the output of a generator 22 through a second input. The slope generator produces a slope VS at the low frequency rate (FIG. 2a). The voltage Vm at the output of the integrator 21 is compared with the slope signal and enables the signal VBF (FIG. 2b) to be produced. The variation in the voltage ST drives that of Vm accordingly, and makes it possible to vary the width Tm of the pulse of the low frequency rectangular signals VBF. This signal with fixed frequency 1/TBF and peak voltage VBF performs an all or nothing modulation of the voltage VHF delivered to the tube. The luminance LT of the tube is modulated in time correspondingly (FIG. 2d). The value LTm represents the mean luminance presented by the tube.

Figure 2:
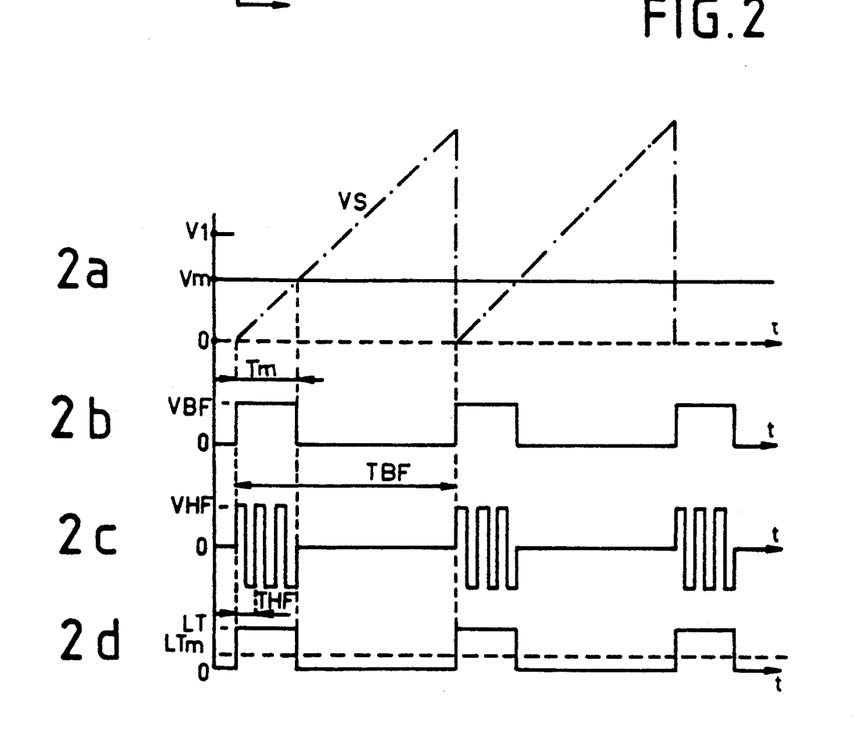
FIGS. 2a–2d show curves pertaining to the operation of the device in the case of a rear illumination with fixed luminance.

The signals are shown in FIG. 2 for a constant value of the control signal ST.

Figure 3:
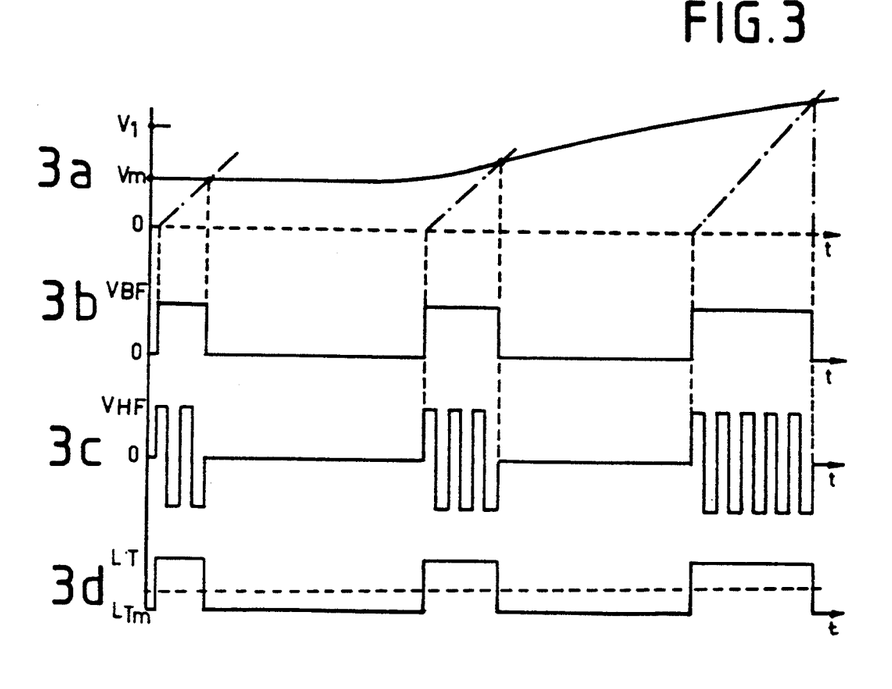
FIGS. 3a–3d show the same curves of operation illustrating the case of a rear illumination with varied luminance.

FIG. 3 represents the same signals for a variation in the control signal ST, thus making it possible to cause a variation in value of the duration of modulation Tm and, consequently, the duration of application of the high frequency supply signal and, hence, the mean luminance LTm of the tube.

Figure 4:
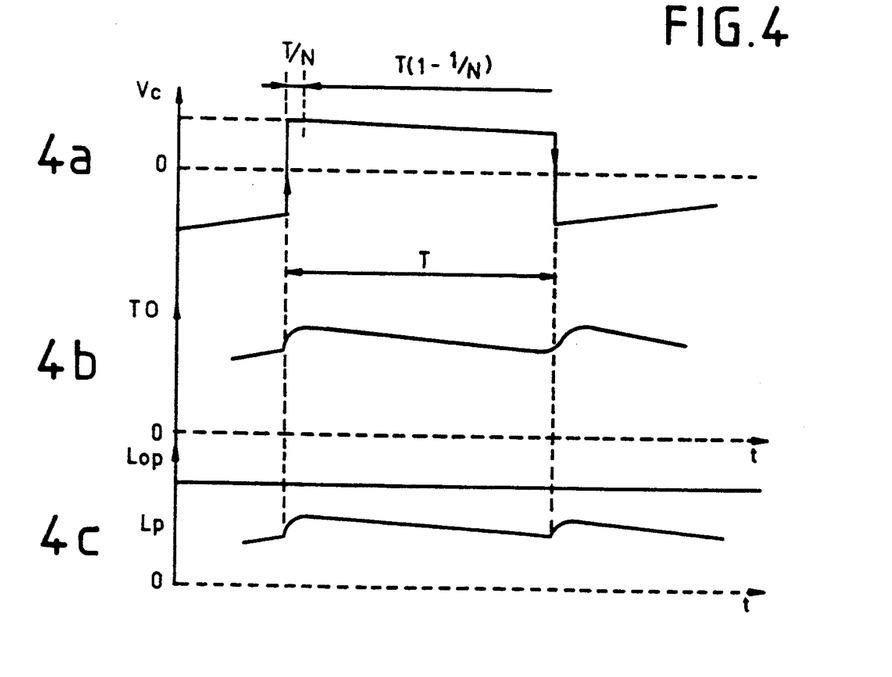
FIGS. 4a–4c show curves depicting the periodic variation in transmission and luminance of a matrix panel pixel.

FIG. 4a represents the voltage control Vc applied to a pixel of a matrix panel with N lines, scanned sequentially during an image period T. FIG. 4b represents the optical transmission TO of the pixel, when this transmission is an increasing function of the rms value of the control value. Its temporal ripple is weighted by elastic and viscous constants presented by the liquid crystal.

FIG. 4c shows the luminance Lp of the pixel which is equal to the rear luminance Lop due to the fluorescent tubes illuminating this pixel multiplied by the optical transmission TO of the pixel.

The temporal mean of the optical transmission of the pixels forming the image may vary according to the pixel or the zone considered, from a minimal value TOmin (to achieve a minimal luminance) to a value TOmax (to achieve a maximal luminance). This variation is obtained by modifying the amplitude of the control voltage Vc proper to each pixel.

Figures 5, 6:
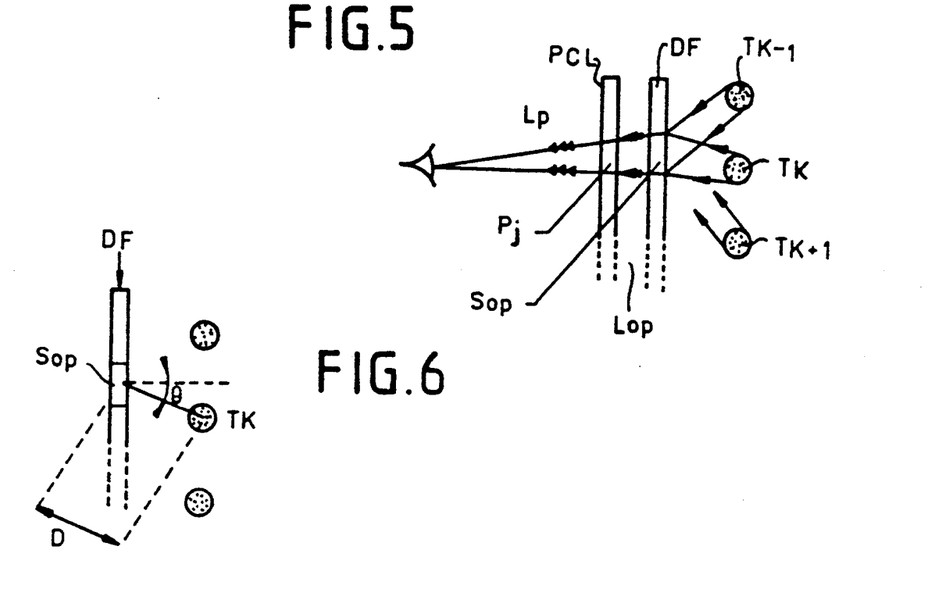
FIGS. 5 and 6 are diagrams illustrating the role played by several neighbouring tubes in the luminance transmitted by a pixel.

Hereinafter (notably in the representations of FIGS. 4, 9 and 10), we consider the waveforms relating to a single value which is intermediate (for example a mean) between these two extreme values FIGS. 5 and 6 show that the rear luminance Lop illuminating a pixel Pj is equal to the weighted sum of the luminance values of the fluorescent tubes TK, TK−1, TK+1 neighbouring the surface Sop of the scattering device DF illuminating the considered pixel Pj of the liquid crystal panel PCL. This weighting depends on the distance D from each tube to the surface Sop of the scattering device DF and on the angle θ presented between the normal to the scattering device and the straight line joining the center of the tube to the center of the illuminating surface Sop.

Figure 7:
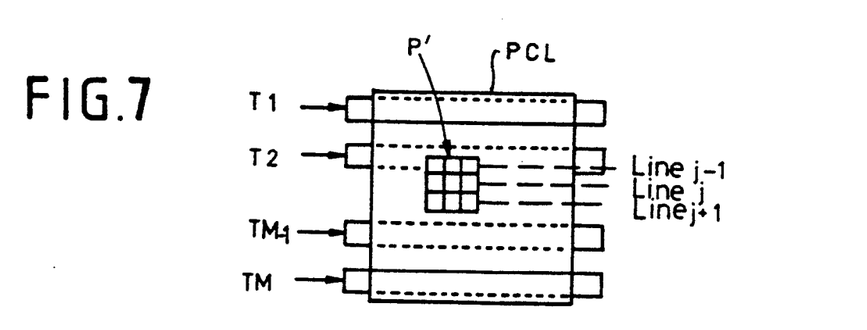
FIGS. 7 and 8 are diagrams illustrating the zone of pixels to be taken into account, consequent to the visual resolution.
Figure 8:
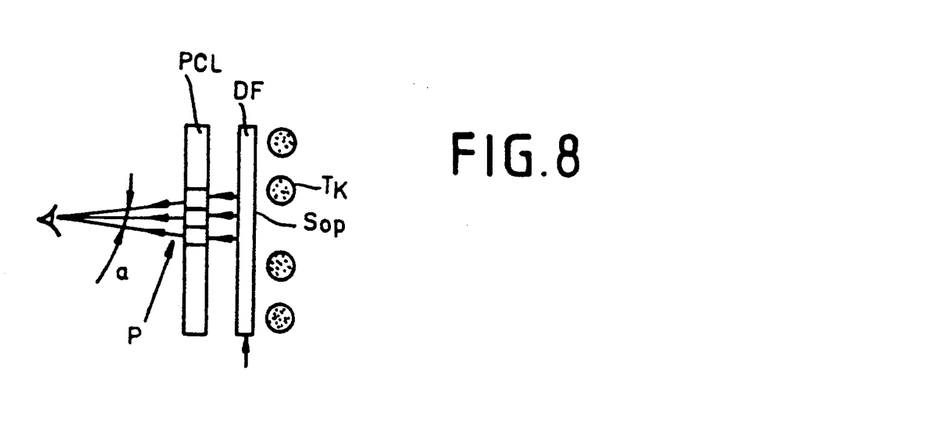

Furthermore, the usual distance of observation of a display panel should be considered to be generally such that the eye cannot isolate a pixel from its neighbours. This is shown by means of FIGS. 7 and 8. The eye is sensitive, comprehensively, to the luminance of a zone surrounding the pixel considered. This luminance is, therefore, the sum of the luminance values of each of the pixels forming the zone. The value of the angle "a" covering the zone is smaller than or, at the most, equal to the visual angular definition. In FIGS. 7 and 8, the zone corresponding to this visual resolution has been considered to be distributed over three lines Lj, Lj−1 and Lj+1 and encompasses three pixels linewise and three pixels columnwise, giving a total of 9 pixels of a screen or panel PCL.

Figure 9:
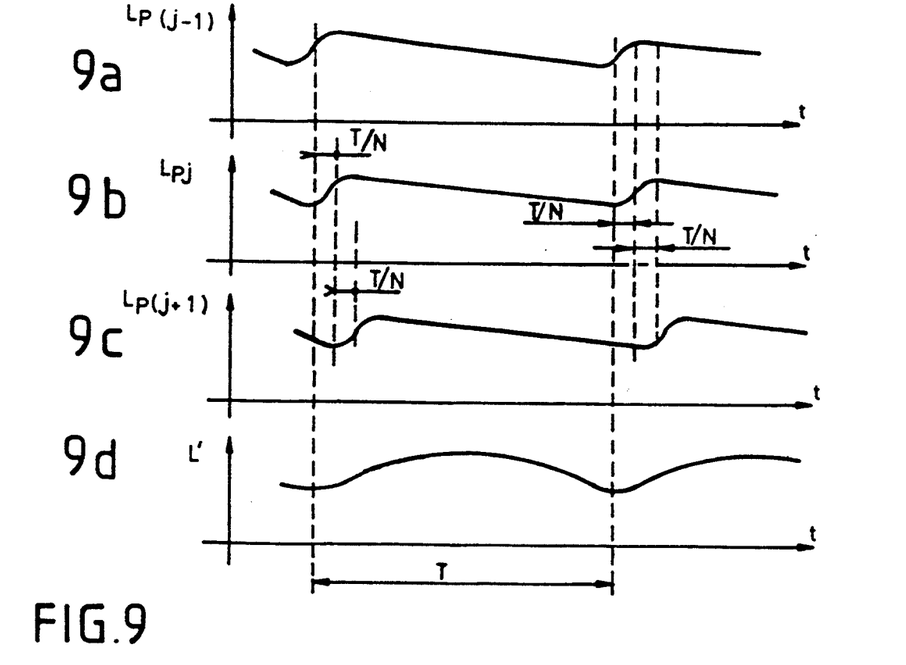
FIGS. 9a–9d show curves of periodic variation in the concept of FIGS. 7 and 8.

For a fixed luminance of the rear illumination of the panel, the instantaneous luminance of the zone distributed over several lines is the sum of the luminance values of each of the pixels forming it. FIG. 9 shows the luminance of each pixel of the three successive lines Lj−1, Lj and Lj+1. The luminance of each pixel of the line Lj−1 has a phase lead, of the value T/N, over the luminance of each pixel of the line, Lj (FIGS. 9a, 9b). The same is true for the line Lj with respect to the line Lj+1 (FIGS. 9b, 9c). The curve 9d represents the overall weighted luminance L' of the zone considered. This luminance is in phase with the luminance of the central line Lj. Its relative variation is consequently less sudden than for each line considered.

The cyclical variation at the image period T presented by this luminance L' produces a flicker phenomenon which is troublesome to the eye.

Figure 10:
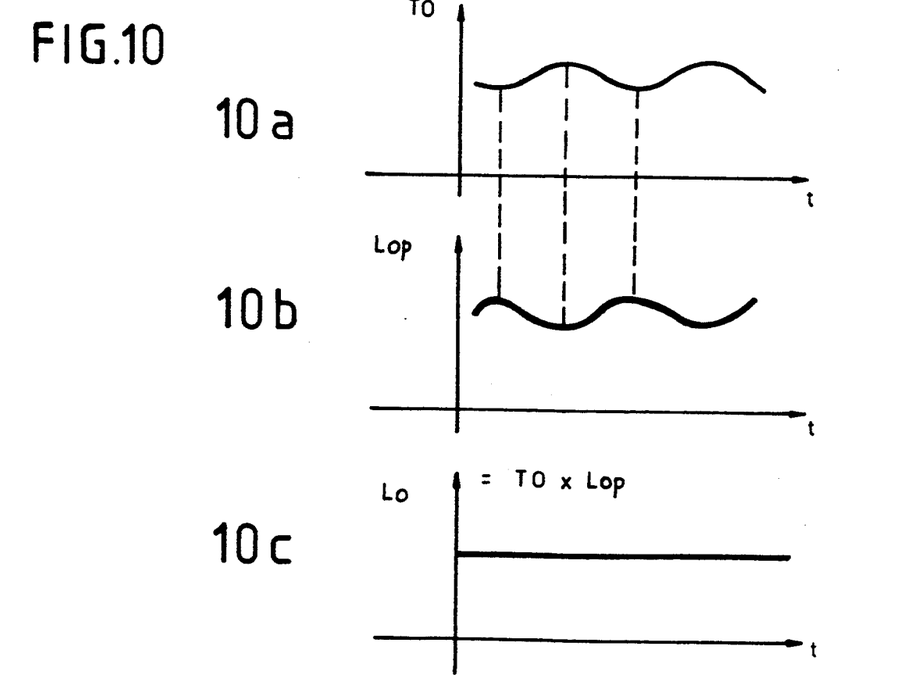
FIGS. 10a–10c show curves illustrating the luminance to be created opposite the optical transmission of the pixels to obtain a substantially constant resultant luminance.

To overcome this, a temporally variable rear luminance is produced in order to compensate for the variation in luminance of the zone L' and to give a substantially constant resultant luminance. This is summarized in the curves of FIG. 10. The curve 10a reproduces the variation of optical transmission TO of a zone of pixels encompassing several successive lines of the liquid crystal panel. The curve 10b represents the variation in rear luminance Lop to be emitted by the battery of tubes in phase opposition with the preceding variation TO so as to obtain a constant luminance Lo according to the curve 10c. This result is obtained by preparing a modulation voltage VBF which is cyclically variable. The generators 2 and 3 are therefore determined in order to deliver a modulation voltage which is synchronous with the scanning of the panel and is phase shifted from one panel to the next one. The modulation Vm and the phase shifts are determined in such a way that the relative ripple of the luminance Lop of the surface Sop of the scattering device illuminating the zone P' is approximately the opposite of the relative variation of the optical transmission TO of the zone P' (curves 10a and 10b).

Figures 11, 12:
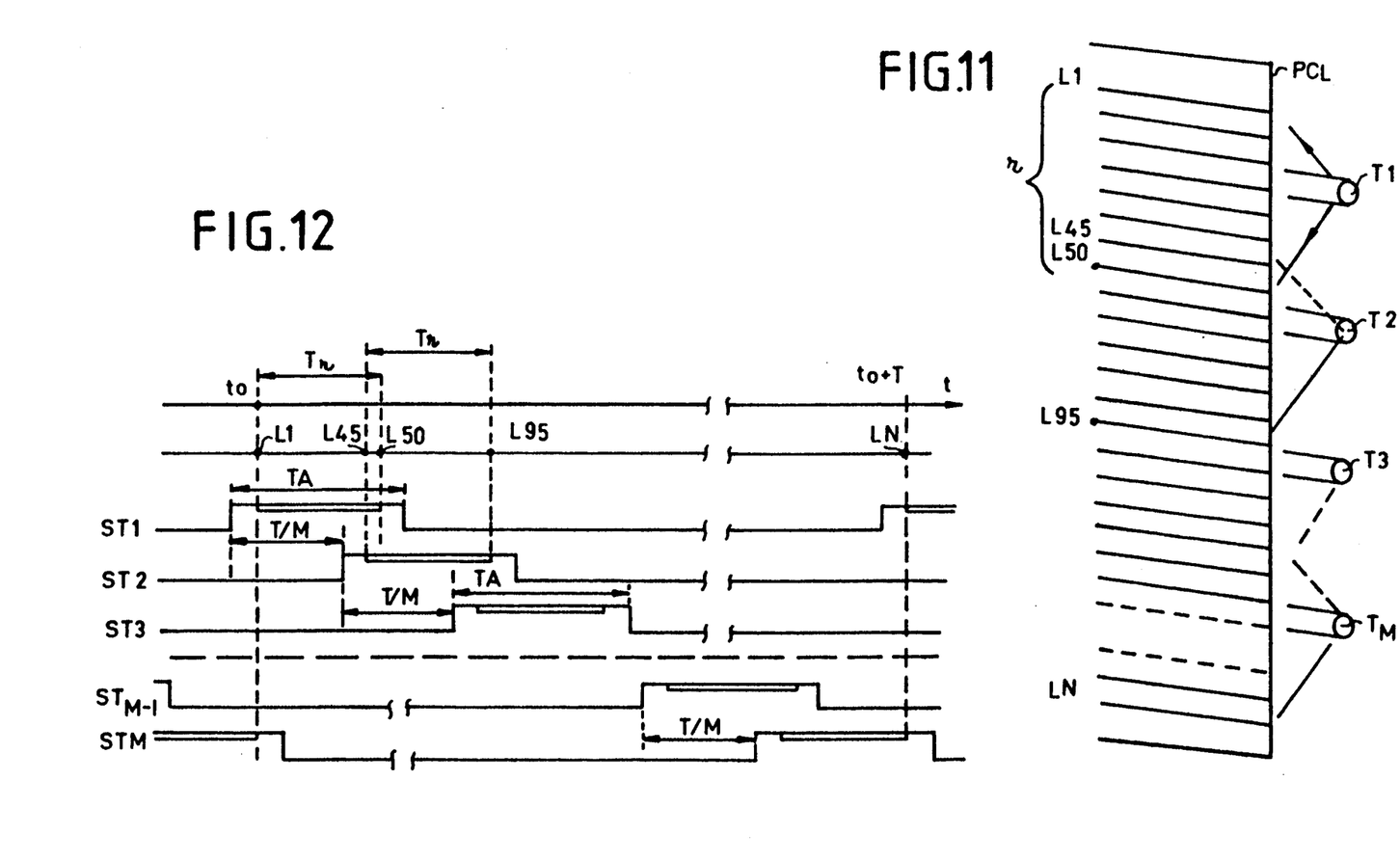
FIG. 11 is a diagram showing the zones of lines of a matrix panel illuminated by fluorescent tubes.
FIG. 12 shows curves illustrating the temporal distribution of the control signals for the supply of the tubes and their relative phase shift to obtain the desired result.

FIGS. 11 and 12 illustrate this method used. The device has a battery of M fluorescent tubes T1 to TM, placed parallel to the direction of the lines L1 to LN of the pixels of the matrix panel. Each tube illuminates a zone of "r" lines with, for example r=50. To simplify the description, the scattering device has not been shown, and the temporal smoothing and delay, given by the filtering and integration circuits receiving the ST signals, is not considered. The illumination produced by the successive tubes generally overlap one another in the terminal parts of the zones. The phase shift to be produced for the supply from one tube to the next one is equal to T/M. The period during which each tube is activated in the vicinity of its maximum value should be enough to encompass the time interval during which the "r" lines illuminated by this tube are themselves scanned during the frame period considered. FIG. 12 gives a more explicit view of these durations in showing the shift T/M between the supply of a tube and that of the following tube. The duration TA of maximum supply of each tube, repeated at the frame period T, is chosen to be great enough to encompass the scanning of the corresponding zone of "r" lines of the liquid crystal panel. Thus, in the case of the first tube, the supply control signal ST1 goes beyond the duration Tr for the scanning of the lines L1 to L50, illuminated by the tube T1. The range TA is substantially centered on the duration Tr. The same is the case for the following tubes T2 to TM.

The reasoning employed, with the help of FIG. 9, for a small zone P' of pixels is valid for all the pixels extending over the three lines considered, and is also valid for a zone of "r" lines (r being greater than 3) illuminated by a tube, it being understood that the overall transmission of the zone of "r" lines is the weighted value of each of the lines, and is in phase with the mean transmission of the pixels of the median line (line 25 in the case of the first zone illuminated by the tube T1). The device is consequently designed to control the luminance of each tube during the time phase to to to+Tr that corresponds, in an opposite way to the variation in transparency TO presented by the zone "r" (FIGS. 10a and 10b). Thus, the observer has the impression of receiving a constant luminance (curve 10c) for each of the zones of "r" lines with the same mean transmission and, hence, for the entire image with uniform luminance during the scanning with a duration T. The harmful frequencies creating the flicker phenomenon are thus diminished.

Figure 13:
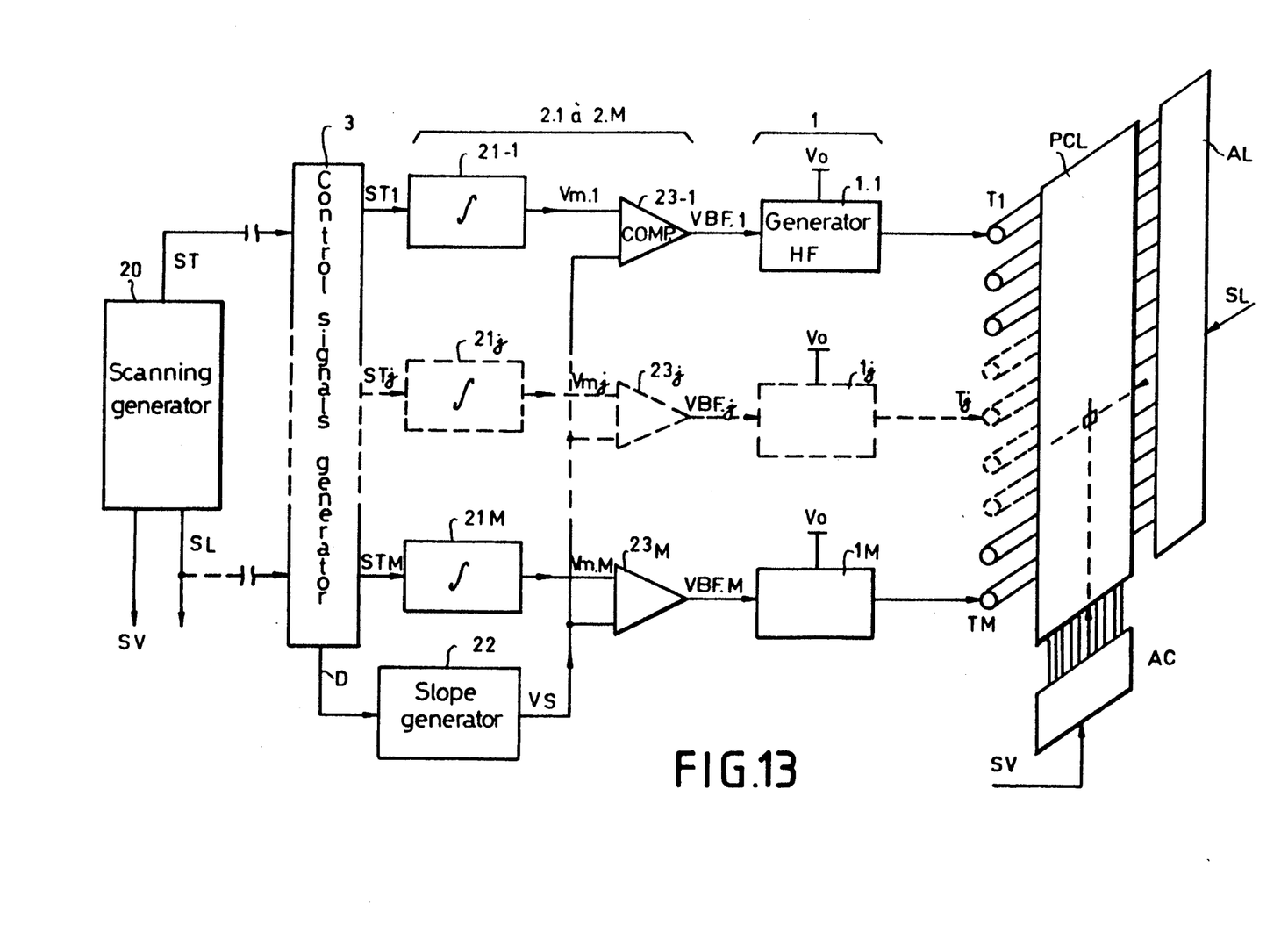
FIG. 13 is a block diagram of a rear illumination device for a liquid crystal matrix panel according to the invention.

FIG. 13 shows a liquid crystal panel PCL with its column addressing circuits AC and its line addressing circuits AL, and the rear illumination comprising a battery of tubes T1 to TM parallel to the direction of the lines. A scanning generator 20 gives the line synchronization signals SL and frame synchronization signals ST, and the video signal SV. This video signal SV may consist simply of a piece of binary information to excite or extinguish the corresponding pixel. The generator 3 of signals for the control of the tubes receives the synchronization signals SL and ST and, from these signals, it prepares the phase-shifted signals ST1 to STM for controlling the supply of the tubes T1 to TM. By an additional output D, it controls the slope generator 22 at the desired low frequency TBF. The other circuits of the low frequency pulse generator are distributed over M channels each comprising an integrator 21j and a comparator circuit 23j. The latter also receives the common slope signal VS. Similarly, the HF supply is distinct for each tube, and is controlled by the output of the corresponding comparator 23j.

Figure 14:
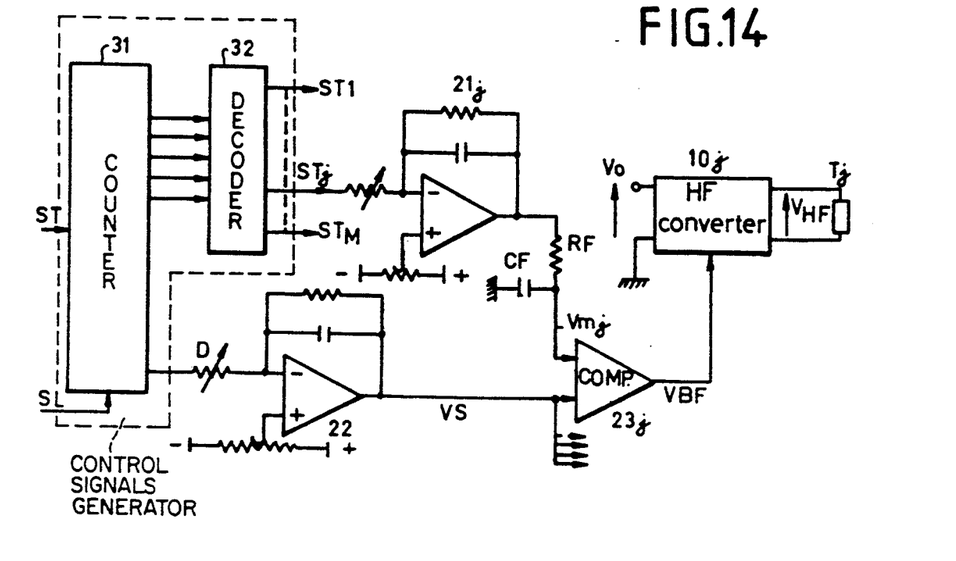
FIG. 14 shows an exemplary embodiment of the circuits of the device according to FIG. 13.
Figure 15:
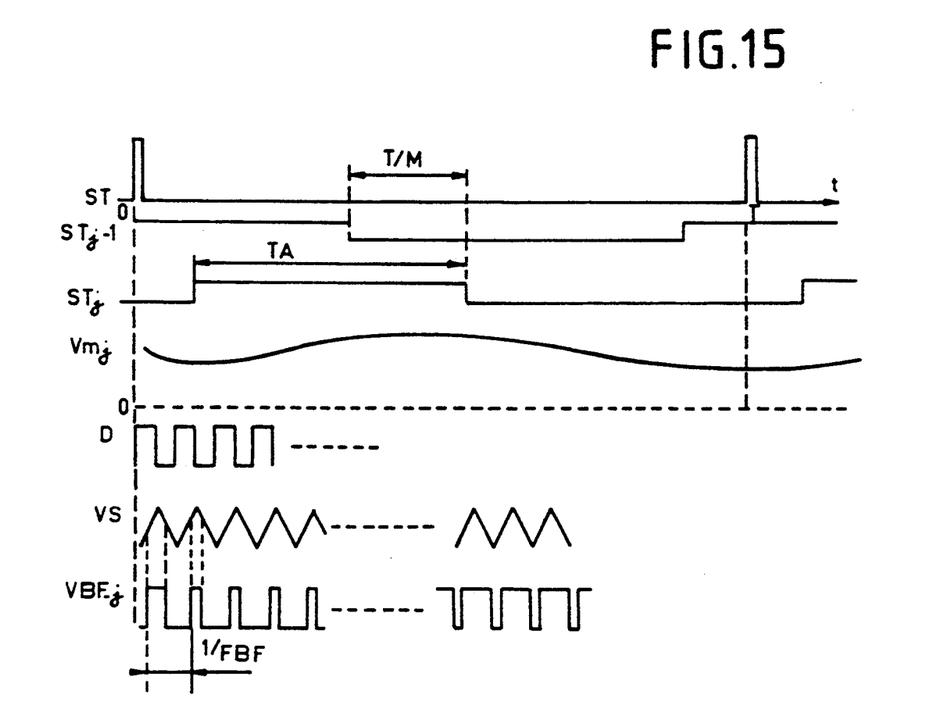
FIG. 15 shows curves of the operation of the circuits of FIG. 14.

In the embodiment according to FIG. 14, the control signals generator 3 is formed by a counter 31 followed by a decoder 32. The counter 31 receives the frame signal ST (FIG. 15) which resets the counter at zero at each image scan. The lines synchronization SL represents a clock signal which increments the counter. The counter 31 addresses a decoder circuit 32 at output. Depending on the binary word received, this decoder circuit 32 gives the supply signals ST1 to STM, successively during the time intervals TA in synchronism with the scanning. Furthermore these signals have a phase shift T/M from one tube to the next (STj−1, STj FIG. 15). The channel "j" relating to the tube Tj has been shown supplied by the synchronization signal STj. The channels are all identical and receive, besides, the output VS from the slope generator 22. Each channel has a low-pass filtering circuit RF, CF, following an integrator 21j, and gives the voltage Vmj, enabling compensation for the transmission of the tube illuminated zone (FIG. 10). The line counter 31 further gives a bit counter D (FIG. 15) at the chosen modulation low frequency. This logic signal is filtered by an integrator assembly 22 delivering a sawtoothed voltage VS with a same frequency. The mean value and the amplitude of modulation of VS can be adjusted by the settings shown. The voltage VS is compared with each of the m voltages Vm by the m comparators 23.1 to 23M giving the voltages VBF.1 to VBFM driving the M converters 10.1 to 10M of the M tubes T1 to TM. Other settings relating to the integrator 21j and to the value of the elements RF, CF are implemented during a preliminary phase to adjust the desired curve Lop FIG. 10b) compensating for the ripple of the curve TO (FIG. 10a) and obtain the resultant uniform luminance Lo (FIG. 10c).

For a real image made on the panel, the transmission of any pixel varies as a function of the pixel considered, from the value TOmin to the value TOmax, each having an inherent relative ripple amplitude. The abovementioned value TO is between the value TOmin and the value TOmax.

What is claimed is:

1. A method for rear illumination of a liquid crystal panel formed by a matrix of pixels arranged in a predetermined number of successive lines, said liquid crystal panel being scanned sequentially during an image refreshing period of T, rear illumination being provided by M tubes, where M is a whole number greater than 1, arranged behind said liquid crystal panel, said method comprising the steps of:

supplying M consecutive control signals associated with each tube to M modulators, respectively, each control signal for controlling a chopping rate of M consecutive low frequency periodic pulse control signals, each consecutive control signal being phase shifted by T/M from the preceding signal;

independently adjusting each control signal to independently adjust modulation of each chopping rate for each of the M consecutive low frequency periodic pulse control signals based on a predetermined mean optical transmission of a zone of pixels associated with each tube;

producing in each modulator a low frequency periodic pulse control signal modulated in pulse width in response to each adjusted control signal;

driving M converters to produce M high frequency voltages from a DC voltage based on each respective low frequency periodic pulse control signal;

supplying each high frequency voltage to an associated tube to rear illuminate a zone of pixels associated with each tube.

2. A method according to claim 1, wherein a duration of the high frequency voltage supply of each tube, achieved periodically at the panel image refreshing period, is chosen to be greater than a duration of scanning of a zone of pixels associated with each tube.

3. An apparatus for the rear illumination of a liquid crystal panel formed by a matrix of pixels arranged in a predetermined number of successive lines, said liquid crystal panel scanned sequentially during an image refreshing period of T, said apparatus comprising:

M tubes, where M is a whole number greater than 1, arranged behind said liquid crystal panel, each tube for rear illuminating a zone of pixels associated therewith;

control means for individually controlling a light intensity of each tube, said control means comprising:

a control signal generator for generating M control signals having mutual phase shift of T/M, M control signal adjusting means for adjusting each control signal based on a predetermined mean optical transmission of a zone of pixels associated with a respective tube;

M modulating means for producing M low frequency periodic pulse control signals with individually determined chopping rate modulation, the chopping rate modulation of each low frequency periodic pulse control signal based on a respective adjusted control signal, and M high frequency generators associated with each modulating means for producing M high frequency AC voltages from a DC voltage in response to a respective low frequency periodic pulse control signal, each high frequency AC voltage being supplied to a respective tube, thereby producing a rear illumination in synchronism with the scanning and in opposition with a predetermined optical transmission of said liquid crystal panel.

4. An apparatus according to claim 3, wherein the control means further comprises:

an ancillary scanning generator for generating frame and line synchronization signals and a slope generation signal, the control signal generator generating the control signals based on the frame and line synchronization signals;

each control signal adjusting means is an integrator circuit;

each modulating means comprises:

a slope generator for generating a slope signal from the slope generation signal;

a comparator for producing the low frequency period pulse control signal based on the slope signal and the adjusted control signal.

5. An apparatus according to claim 4, wherein the control signal generator comprises a counter circuit, which is reset by the frame synchronization signal, to increment the line synchronization signal, and a decoder having an input coupled to the counter circuit to generate the M control signals.

6. An apparatus according to claim 4, wherein each of the M modulating means includes a respective one of the M control signal adjusting means.

7. An apparatus according to claim 4 or 5 wherein each integrator circuit includes an operational integrator followed by a low frequency filtering circuit, the integrator circuit having predetermined operational settings for adjusting a control signal to produce a ripple in the luminance of a corresponding tube substantially in phase opposition with a mean optical transmission of a zone of pixels facing the corresponding tube.

* * * * *